Sept. 26, 1939.   R. E. COLE   2,174,504
TRANSMISSION
Filed Nov. 17, 1937
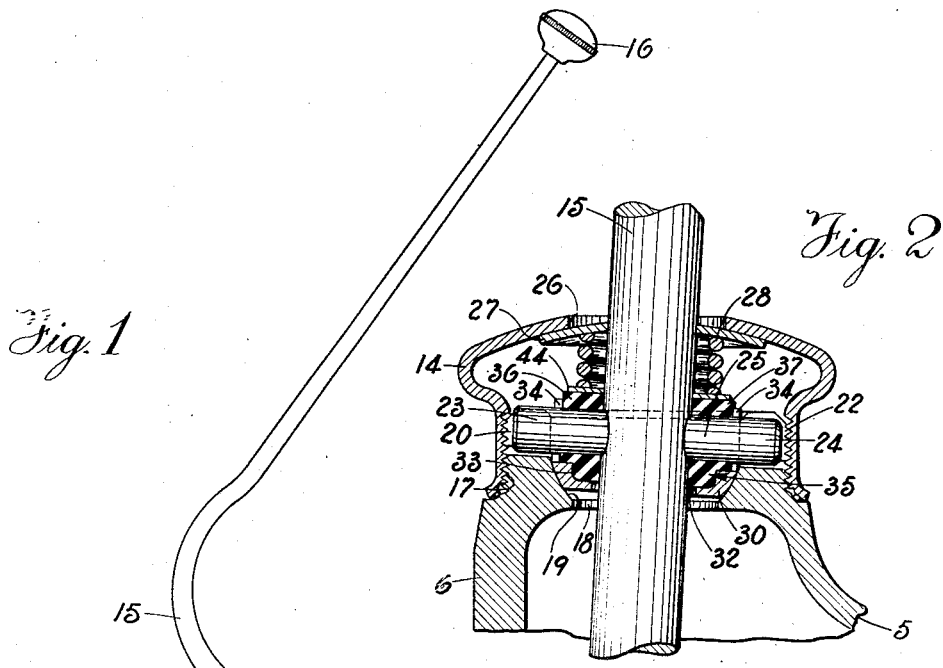
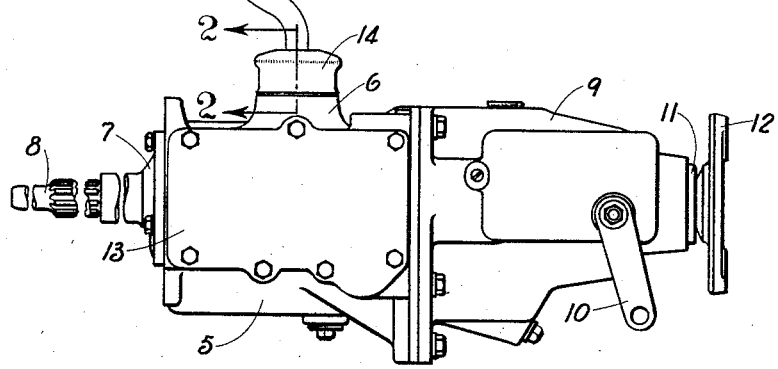
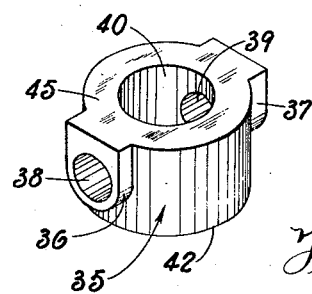
INVENTOR.
Roy E. Cole
BY Walter E. Schismer
ATTORNEYS.

Patented Sept. 26, 1939

2,174,504

UNITED STATES PATENT OFFICE 2,174,504

TRANSMISSION

Roy E. Cole, South Bend, Ind., assignor to The Studebaker Corporation, South Bend, Ind., a corporation of Delaware Application November 17, 1937, Serial No. 174,989

16 Claims. (Cl. 74—473)

This invention relates to transmissions, and more particularly is directed to transmissions for use in automotive vehicles and the like in which it is desired to prevent the transmission of vibrations and noises from the change speed gearing and housing to the gear shift lever.

In its preferred form the present invention contemplates the provision of a resilient cushioning member in the universal support mounting of the gear shift lever on the transmission. This member effectively insulates the lever against vibrations, shocks and/or noises which are conducted to the pedestal support from other portions of the transmission assembly and drive mechanism.

One object of the present invention is to cushion the gear shift lever and its cross pin from metal-to-metal contact with the spherical seating portion which is universally supported in the pedestal carried by the transmission housing.

Another object of the present invention is to provide a noise and vibration insulating member which can be incorporated in present constructions without requiring any modification of the pedestal support or its associated parts.

Still another object of the invention is to provide such an insulating member which can be disposed within a cut-out portion of the ball member normally carried intermediate the ends of the gear shift lever.

It is possible, with the present invention, to retain all the advantages of the ball swivelling action heretofore found desirable in gear shift lever mountings, and to retain all the operating characteristics and functions of such a support as has heretofore been employed, while still taking full advantage of the additional advantages provided by the present invention.

Another advantage of the present invention resides in its simplified construction and assembly, as well as its economy in manufacture, so that it may be applied to transmissions at little or no extra expense.

Other objects and advantages of the present invention will appear more fully from the following detailed description which, taken in conjunction with the accompanying drawing, will disclose to those skilled in the art the particular construction and operation of a preferred form of the present invention.

In the drawing:

Figure 1 is an elevational view of a transmission embodying the present invention;

Figure 2 is a sectional view, taken on the line 2—2 of Figure 1, showing the details of the present construction; and Figure 3 is a perspective view of the sound and vibration insulating member shown in Figure 2.

Referring now in detail to the drawing, I have shown in Figure 1 a transmission comprising a transmission housing 5 having the pedestal support 6 rising from the top thereof and having a bearing retainer member 7 secured to the forward end thereof for receiving the drive shaft 8 extending into the transmission. Bolted to the rear face of the transmission is a second housing 9 containing over-drive mechanism or the like controlled by the lever 10 and having a rearwardly extending journaled portion 11 through which the driven shaft extends for connection to the companion flange 12 of the universal joint.

The particular transmission shown in Figure 1 is similar to that shown and described in detail in the copending application of Leo O. Burt, Serial No. 173,312 filed November 8, 1937, in which the transmission has an opening on one lateral side thereof containing the shifting mechanism and closed by a suitable cover plate such as indicated at 13. The internal details of the transmission construction can be ascertained from said copending application and since they in no way are essential to the present invention they will not be described in detail herein.

While I have shown my invention as embodied in a particular type of transmission structure, it is to be understood that this is for purposes of illustration only and that the transmission may be any standard type of transmission, the particular features of the present invention being applicable to transmissions other than the specific type herein shown.

Referring now in particular to Figures 2 and 3, it will be noted that secured upon the pedestal 6 is a cap member 14 through which extends the gear shift lever 15 having a shifter knob 16 in the upper end thereof. The pedestal 6 is provided with an externally threaded lip 17 which is adapted to receive the cap member 14 as clearly shown in Figure 2. The upper end of the pedestal is apertured as at 18 to form an enlarged opening for accommodating the lateral and fore and aft movements of the shift lever through its various shifting positions. Directly above the aperture 18 the pedestal is provided with an annular seating surface 19 which preferably is formed as a spherical seat terminating adjacent its upper portion in oppositely extending lateral slots 20 and 22. These slots are preferably U-shaped openings which are adapted to receive the projecting ends 23 and 24 of a cross pin 25 mounted rigidly in the gear shift lever 15 and extending normally thereto.

The upper end of the cap member 14 is provided with an aperture 26 to accommodate the shifting movements of the portion of the gear shift lever above the cross pin 25 and this opening is preferably closed by the disk or concave plate 27 bearing against the defining surface of the inside of the cap about the opening 26 and pressed into engagement therewith by means of the helical coiled spring member 28.

Disposed for substantially universal movement in the pedestal 6 and having metal-to-metal contact with the surface of the cuplike seat 19 is a second cuplike member or ball 30 which extends about the gear shift lever 15 and has the enlarged opening 32 spacing the same from contact with the gear shift lever.

The member 30 is preferably recessed to provide the annular shoulder 33 which terminates at its upper edge in laterally extending slotted portions 34 through which the projecting ends of the pin 25 extend out of contact therewith.

In order to space the member 30 from any metal-to-metal contact with either the lever 15 or the cross pin 25, I provide the resilient cushioning member 35 shown in more detail in Figure 3. The member 35 is preferably formed of rubber, either natural or synthetic, or of some other cushioning material formed of rubber, either natural or synthetic, or of some other cushioning material having the characteristics suited for the particular purpose for which it is employed. This material is provided for cushioning the gear shift lever 15 against vibration or shock incident to the operation of the transmission mechanism or other portions of the driving means and also serves as a sound-deadening material and prevents the transmission of noises outwardly through the gear shift lever from the transmission mechanism. Preferably the material of which the member is formed should be oil resistant in order that it will not be affected by contact of lubricant therewith. For this purpose I may use some synthetic rubber compounds now on the market which have particularly good characteristics so far as resistance to deterioration from contact with oil or the like is concerned.

The member 35 is provided with two oppositely extending lateral boss portions 36 and 37 which are apertured as indicated at 38 and 39 to receive the projecting ends 23 and 24 of the cross pin 25 and to substantially completely enclose the lateral surface of the pin adjacent the gear shift lever 15. The member 35 is also provided with a cylindrical body portion 40 adapted to receive the gear shift lever 15 and to embrace the same both above and below the point of contact of the cross pin 25 therewith. Adjacent the lower end of the member 35 a seating portion indicated at 42 is provided for seating engagement in the shouldered portion 33 of the member 30 to locate the member 35 therein and to provide a coupling connection whereby movement of the gear shift lever 15 may be transmitted through the cushioning member to the member 30 to provide for swivelling movement of the member 30 on the seat 19.

The member 35 is compressed into position within the member 30, and simultaneously transmits such pressure to the member 30 forcing it firmly on the seat 19, by means of the coil spring 28 which encircles the gear shift lever 15 above the cross pin 25. The lower end of this spring as shown clearly in Figure 2 is biased against a washer or pressure plate 44 which bears against the flat upper surface 45 of the member 35 to apply the spring pressure substantially equally thereto for forcing both the gear shift lever and the members 35 and 30 downwardly to provide positive pressure engagement with the seat 19.

It will be noted that the slot 22 is cut deeper than the slot 20 in the upper portion of the pedestal 6. This is for the purpose of providing a biasing or cocking effect upon the gear shift lever 15 to hold it normally in a laterally cocked position thereby the lower end thereof is forced into engagement with one of the shift rods in the transmission 5. The particular details of such an arrangement and the effects produced thereby are more fully disclosed in the copending Burt application referred to above and do not require a detailed explanation herein.

If desired, the member 35 may be vulcanized into the member 30 to secure a bonding engagement therebetween so that conjoint action of the two members is provided for all shifting movements. However, I have found that the pressure engagement of the member 35 in the member 30 is sufficient to couple these two members together for conjoint movement and that it is not necessary to provide such a bond between these members.

It will be apparent that by the present construction there is no direct metal-to-metal contact from the pedestal 6 to the gear shift lever 15 and the cushioning member 35 effectively insulates the lever and cross pin from metal-to-metal contact with the ball seating member 30 disposed for universal movement in the seat 19 at the upper end of the pedestal 6. This provides for insulation of the gear shift lever 15 against transmission of noises or vibrations thereto from the change speed gearing or overdrive mechanism. It also provides for resilient mounting of the lever within the seating portion of the pedestal which is of distinct advantage in cushioning the lever against shocks transmitted thereto from the driving mechanism.

I am aware that changes in certain specific details of construction and arrangement of the parts may be made in the illustrated embodiment herein described, and I therefore do not intend to limit the invention to the specific details herein shown, but only insofar as defined by the spirit and scope of the appended claims.

I claim:

1. In combination, a transmission housing having a pedestal support comprising an annular upwardly opening spherical seat having oppositely extending lateral slots at the upper end thereof, a gear shift lever having a cross pin rigid therein and having its projecting ends disposed in said slots, an annular spherical member engaging in said seat below said pin, and a resilient nonmetallic cushioning member having portions engaging about said pin and having a cup-shaped base portion seating in said last named member.

2. In combination, a transmission housing having a pedestal support comprising a metallic cup portion therein, a semi-spherical cup member seating in said cup portion and apertured at its lower end to receive the lower end of a gear shift lever, and a rubber insulator embracing said lever adjacent said cup member and seating therein to support said lever resiliently in said cup member for swivelling movement in the cup portion of said pedestal.

3. In a device of the class described, a pedestal, a semi-spherical non-compressible seat formed therein, a gear shift lever having a cross pin extending therethrough, a swivel member having universal movement in said seat and having an enlarged aperture receiving the lower end of said lever below said cross pin, and a resilient cushioning member embracing said lever and the adjacent surfaces of said pin and seated in said swivel member whereby there is no metal-to-metal contact between said lever and pin and said swivel member but the same are coupled for conjoint swivelling movement in said seat.

4. In combination, a pedestal support having a semi-spherical cup-like seat therein, a shaft member extending vertically therethrough, a cup-like metallic member surrounding said shaft and having universal swivelling movement on said seat, a resilient non-metallic means secured to said shaft and engaging in said cup-like member for supporting said shaft in insulated relation on said cup-like member, and spring means urging said non-metallic means against said cup-like member.

5. In combination, a pedestal support having a cup-like annular seat therein, a cup-like member swivelled in said seat and having an enlarged aperture at its base, a gear shift lever extending through said pedestal and the aperture in said cup-like member, and non-metallic cushioning means secured about said lever and seated in said cup-like member.

6. In combination, a pedestal formed integral with a transmission housing and having a transverse portion provided with an apertured cup-like seat terminating at its upper end in opposite laterally extending slots, a cup-like member having universal movement upon said seat, a lever extending through said pedestal and having a rigid cross pin projecting therethrough with the ends of said pin located in said slots, a resilient non-metallic member embracing said shaft about said pin and having short lateral projections spacing the adjacent portions of said cup-like member from said pin, said resilient member having its base seating in said cup-like member for insulating said lever therefrom.

7. The combination of claim 6 including a spring biased against said resilient member for holding the same in said cup-like member under pressure.

8. The combination of claim 6 including spring means encircling said lever and biasing said resilient member against said cup-like member and said cup-like member against said seat.

9. A resilient non-metallic member for a gear shift lever having a rigid cross pin therethrough, comprising a cylindrical body portion embracing said shaft and having oppositely directed short lateral extensions embracing the lateral surfaces of opposite ends of said cross pin adjacent said lever.

10. Means for insulating a universally supported gear shift lever against vibration and sound conduction including a recessed universal mounting support, a resilient non-metallic member embracing said lever and seating in said recess for supporting the same out of metal-to-metal contact with the universal support of said lever in a transmission housing.

11. Means for insulating a gear shift lever against vibration and sound, including a universal mounting support having a semi-spherical seating portion mounted in a spherical pedestal seat in a transmission assembly and having a cross pin extending therethrough, said insulating means comprising a resilient non-metallic member having a body portion interposed between said lever and said seating portion and forming a resilient coupling therebetween, and having short lateral projections interposed between said pin and said seating portion.

12. As an article of manufacture, a rubber cushioning member for a gear shift lever comprising a cylindrical body portion having an axial bore therethrough to receive said lever, said body portion having diametrically opposite lateral extensions having alined openings extending normally to said bore.

13. In combination, a pedestal having a semi-spherical seat, a gear shift lever extending therethrough and having a cross pin, a cup-shaped metallic member loosely fitting about said lever and having U-shaped slots in opposite sides thereof spaced about the projecting ends of said pin, said member having universal support on said seat, and a rubber member embracing said lever and seated in said member, said rubber member having integral lateral extensions enclosing the portions of said pin adjacent the lever and located in said slots whereby there is no metal-to-metal contact between said lever and said cup-shaped seating member.

14. In combination, a pedestal support having a cup-like annular seat therein, a cup-like member swivelled in said seat, a gear shift lever extending through said pedestal and the base of said cup-like member, non-metallic cushioning means secured about the lever and engaging in said cup-like member, a cap over said pedestal having an enlarged aperture through which said lever extends, a washer embracing said lever and closing said opening, and spring means about said lever biased at one end against said washer and at the opposite end against said cushioning means.

15. In combination, a tubular member having an integral annular cup-shaped seat therein, a cup-like member swivelled on said seat and having an aperture through the base thereof, a rod extending through the tubular member and said aperture, non-metallic cushioning means secured about said rod against axial movement and having a body portion seated in said cup-like member, and spring means normally urging said cushioning means and cup-like member against said seat.

16. In combination, a tubular member having an integral annular cup-shaped seat therein, a cup-like member swivelled on said seat and having an aperture through the base thereof, a rod extending through the tubular member and said aperture, non-metallic cushioning means secured about said rod against axial movement and having a body portion seated in said cup-like member, and spring means normally urging said cushioning means and cup-like member against said seat, said cushioning means being so shaped as to prevent any metal-to-metal contact between said rod and cup-like member.

ROY E. COLE.